(12) United States Patent
Wood et al.

(10) Patent No.: US 8,059,344 B2
(45) Date of Patent: Nov. 15, 2011

(54) MULTI-BAND LENS

(75) Inventors: Roland A. Wood, Bloomington, MN (US); Bernard S. Fritz, Eagan, MN (US)

(73) Assignee: Honeywell International Inc., Morristown, NJ (US)

( * ) Notice: Subject to any disclaimer, the term of this patent is extended or adjusted under 35 U.S.C. 154(b) by 1162 days.

(21) Appl. No.: 11/160,048

(22) Filed: Jun. 7, 2005

(65) Prior Publication Data

US 2006/0274431 A1 Dec. 7, 2006

(51) Int. Cl.
*G02B 13/00* (2006.01)
(52) U.S. Cl. .................................. 359/722; 359/356
(58) Field of Classification Search .............. 359/355, 359/356, 722, 733, 724, 741, 735, 736
See application file for complete search history.

(56) References Cited

U.S. PATENT DOCUMENTS

| | | | | |
|---|---|---|---|---|
| 2,493,110 A * | 1/1950 | Corman | .............. | 359/355 |
| 2,978,956 A * | 4/1961 | Howell | .............. | 359/356 |
| 4,921,318 A * | 5/1990 | Szumski | .............. | 359/356 |
| 4,950,056 A * | 8/1990 | Smith | .............. | 359/366 |
| 4,989,962 A | 2/1991 | Kebo | | |
| 4,996,427 A | 2/1991 | Noble et al. | | |
| 5,161,051 A * | 11/1992 | Whitney et al. | .............. | 359/351 |
| 5,497,266 A * | 3/1996 | Owen | .............. | 359/353 |
| 5,808,350 A | 9/1998 | Jack et al. | | |
| 5,811,815 A | 9/1998 | Marshall et al. | | |
| 6,097,031 A | 8/2000 | Cole | | |
| 6,208,459 B1 * | 3/2001 | Coon et al. | .............. | 359/355 |
| 6,609,812 B2 | 8/2003 | Machi et al. | | |
| 6,665,116 B1 | 12/2003 | Harvey et al. | | |
| 6,694,094 B2 | 2/2004 | Partynski et al. | | |
| 6,826,358 B2 | 11/2004 | Partynski et al. | | |
| 6,870,690 B1 * | 3/2005 | Lawson et al. | .............. | 359/722 |
| 6,927,912 B2 | 8/2005 | Dubin et al. | | |
| 2003/0001093 A1 | 1/2003 | Wood | | |
| 2003/0222208 A1 | 12/2003 | Guenter et al. | | |
| 2005/0052755 A1 | 3/2005 | Lawson et al. | | |
| 2005/0094095 A1 | 5/2005 | Marason et al. | | |

OTHER PUBLICATIONS

Esco Products, Inc., [online], [retrieved on Aug. 15, 2008] Retrieved from the Internet <URL: http://www.escoproducts.com/html/bk-7_optical_glass.html>.*

(Continued)

*Primary Examiner* — Mark Consilvio
(74) *Attorney, Agent, or Firm* — Seager, Tufte & Wickham LLC

(57) ABSTRACT

An optical lens system that focuses both a first band of wavelengths and a second band of wavelengths onto a common focal plane. In some cases, the lens system includes a first region for focusing a first band of wavelengths onto a focal plane, and a second region for focusing a second band of wavelengths onto the same focal plane. Depending on the wavelengths and materials involved, the first region may or may not focus the second band of wavelengths onto the focal plane, and in some cases, may or may not even transmit the second band of wavelengths to the focal plane. Likewise, the second region may or may not focus the first band of wavelengths onto the focal plane, and in some cases, may or may not even transmit the first band of wavelengths onto the focal plane, but this is not required. In some embodiments, an additional lens may be provided between the lens system and the common focal plane to help focus the first band of wavelengths and the second band of wavelengths onto the common focal plane. The additional lens may be made from a material or material system that transmits and focuses both the first band of wavelengths and the second band of wavelengths.

13 Claims, 9 Drawing Sheets

OTHER PUBLICATIONS

Del Mar Ventures, Inc., [online], [retrieved on Aug. 15, 2008] Retrieved from the Internet <URL: http://www.dmphotonics.com/ZnSe0601.PDF>.*

Harrick Scientific Products, Inc., [online], [retrieved on Aug. 15, 2008] Retrieved from the Internet <URL: http://www.harricksci.com/infoserver/Optical%20Materials/Calcium%20Fluoride.cfm>.*

* cited by examiner

US 8,059,344 B2

MULTI-BAND LENS

FIELD

The present invention relates generally to optical lenses and more particularly to multi-wavelength lenses.

BACKGROUND

In many applications, such as surveillance, military, detection, imagery, as well as others, it may be desirable to view multiple bands of the electromagnetic spectrum at the same time. Each band may provide some information about the scene that other bands cannot provided as easily. For example, the visible spectrum may be useful for providing an overall visual representation of a scene under good or relatively good lighting conditions. The millimeter (mm) wave band may be useful for providing a visual representation of a scene under long range or inclement weather conditions, as it may penetrate fog, rain and even opaque solids. The infrared band may be useful in determine temperature characteristics of an object in a scene. These are only a few examples. By viewing multiple bands of the electromagnetic spectrum at the same time, a viewer may be able to gain a better understanding of the scene.

Some existing systems capable of providing multiple band images optically separate the different wavelength bands, and process the bands separately, before combining the results to provide a multi-band scene. For example, and in some cases, a beam splitter or the like is used to optically separate the different bands into separate optical paths. In other cases, different bands of wavelengths are focused onto different focal planes, and separate detectors are provided at the different focal planes. In many of these cases, image processing is used to combine the information gained from the different bands into a common scene.

SUMMARY

The following summary of the invention is provided to facilitate an understanding of some of the innovative features unique to the present invention and is not intended to be a full description. A full appreciation of the invention can be gained by taking the entire specification, claims, drawings, and abstract as a whole.

The present invention generally relates to optical lenses and more particularly to multi-wavelength or multi-band optical lenses. In one illustrative embodiment, a lens system is provided that focuses both a first band of wavelengths and a second band of wavelengths onto a common focal plane. In some cases, this may reduce the complexity and/or cost of capturing and processing multiple band images of a scene.

In some cases, the lens system includes a first region for focusing a first band of wavelengths onto a focal plane, and a second region for focusing a second band of wavelengths onto the same focal plane. Depending on the wavelengths and materials involved, the first region may not focus the second band of wavelengths onto the focal plane, and in some cases, may not even transmit the second band of wavelengths to the focal plane.

In some illustrative embodiments, the first region is formed from a first material or material system, and the second region is formed from a second material or material system. The first material or material system may be adapted to transmit and focus the first band of wavelengths, and the second material may be adapted to transmit and focus the second band of wavelengths. For example, when the first region is adapted to focus light in the visible band, the first material may include, for example, glass, polymer or any other suitable material or material system, as desired. When the second region is adapted to focus light in the infrared band, the second material may be, for example, germanium or any other suitable material or material system. In some case, the first region and second region may be part of a first lens structure, and a second lens may be situated between the first lens structure and the common focal plane.

In some illustrative embodiments, the first region may have an annular shape that defines a hole in the middle, and the second region may be situated in the hole of the first region. The relative dimensions of the first region and the second region may be selected based on, for example, the relative desired intensities of the first band of wavelengths and the second band of wavelengths at the common focal plane.

The above summary is not intended to describe each disclosed embodiment or every implementation of the present invention. The Figures and the detailed description which follow more particularly exemplify illustrative embodiments.

BRIEF DESCRIPTION

DETAILED DESCRIPTION

Figure 1:
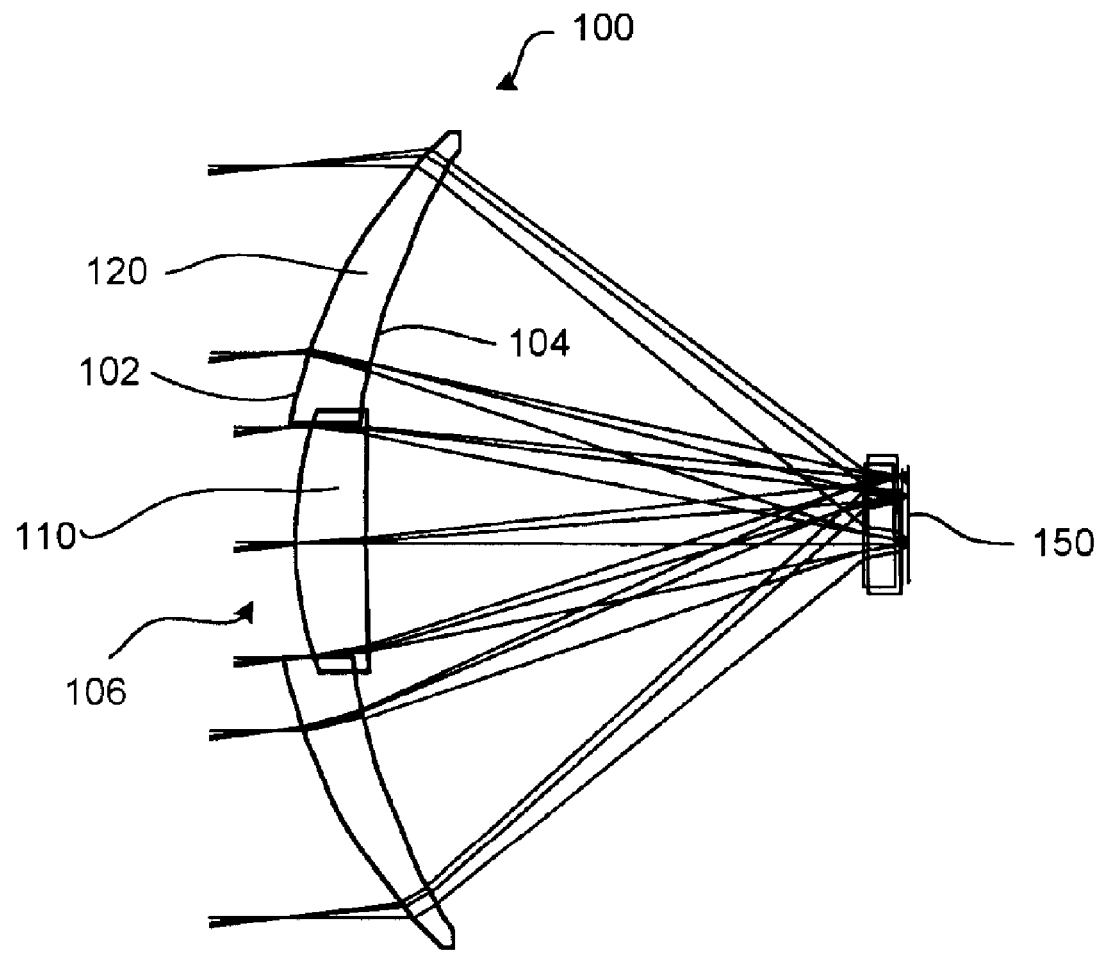
FIG. 1 is a schematic diagram of an illustrative embodiment of a dual-band lens.

The following description should be read with reference to the drawings wherein like reference numerals indicate like elements throughout the several views. The detailed description and drawings show several embodiments which are meant to be illustrative of the claimed invention.

FIG. 1 is a schematic diagram of an illustrative embodiment of a multi-band lens. The illustrative lens system is shown generally at 100, and includes a first lens region or member 110 that transmits and focuses a first wavelength band of radiation, and a second lens region or member 120 that transmits and focuses a second wavelength band of radiation onto a common focal plane. The second lens member 120 may not focus the first wavelength band of radiation onto the common focal plane, and in some cases, may not even transmit the first wavelength band of radiation. Likewise, the first lens member 110 may not focus the second wavelength band of radiation onto the common focal plane, and in some cases, may not even transmit the second wavelength band of radiation. However, this is not required.

The illustrative lens system 100 has an incoming light surface 102 and an outgoing light surface 104. In the illustrative embodiment, the first lens member 110 forms at least part of both the first surface 102 and the second surface 104, as shown. Also, the second lens member 120 forms at least a part of both the first surface 102 and the second surface 104. The first lens member 110 and the second lens member 120 may be positioned to focus the first wavelength band of radiation and the second lens member 120, respectively, onto the common focal plane 150.

In one illustrative embodiment, the first lens member 110 may be adapted to transmit and focus at least part of the visible radiation band of the electromagnetic spectrum, and the second lens member 120 may be adapted to transmit and focus at least part of the infrared radiation band of the electromagnetic spectrum. When so provided, the first lens member 110 may be formed from, for example, glass, polymer or any other suitable material or material system, as desired. When the second lens member 120 is adapted to transmit and focus radiation in the infrared band, the second material may be, for example, germanium or any other suitable material or material system. Germanium has relatively good characteristics for the transmission of the infrared band and relatively poor transmission for the ultraviolet band, visible band, and infrared band up to about 2 micrometers. Additionally, germanium has a high index of refraction, typically around 4 to 4.1, depending on the wavelength, which can be desirable in some applications.

In some cases, the first lens member 110 and the second lens member 120 may be adapted to transmit and focus the visible band, the mid-infrared band, the x-ray band, the ultraviolet band, or any other band or part of a band of the electromagnetic spectrum, as desired. More generally, it is contemplated that each of the first lens member 110 and the second lens member 120 may be formed from any material or material system that is suitable for transmitting and focusing a selected electromagnetic spectrum band of radiation. In the illustrative embodiment shown in FIG. 1, the focal length of the first lens member 110 and the second lens member 120 may be anywhere from 1 mm to 100 mm. However, it is contemplated that the focal length may be smaller or larger, as desired. Also, it is contemplated that the focal lengths of the first lens member 110 and the second lens member may be different. The first lens member 110 and the second lens member 120 may then be positioned relative to one another so that the first wavelength band and the second wavelength band are both focused on a common focal plane.

The second lens member 120 may be annular in shape, and may define an opening 106. In the illustrative embodiment, the opening 106 is radially centered in the second lens member 120. In some cases, having the opening 106 at the radial center may make it easier and cheaper to construct the second lens member 120 due to its rotational symmetry. Also, imaging the multiple band of radiation onto a common focal plane may be easier. In other cases, the opening 106 may be offset to one side of the lens 100, or anywhere else as desired. It is also contemplated that the opening 106 may have a uniform radius, while in other cases the opening 106 may be tapered towards either the front or the back of the opening 106. Additionally, and in some cases, there may be more than one opening 106, if desired.

In the illustrative embodiment, the first lens member 110 is positioned in the opening 106 of the second lens member 120. The first lens member 110 may be situated so that it is flush with the surfaces of the second member 120, recessed from one or both surfaces of the second lens member 120, protruding from one or more of the surfaces of the second lens member 120, or situated any other way, as desired. In the illustrative embodiment, the first lens member 110 may transmit and focus the visible band of the electromagnetic spectrum. However, in other cases, the first lens member 110 may transmit and focus the infrared band, the mid-infrared band, the ultraviolet band, the x-ray band or any other band of the electromagnetic spectrum, as desired.

In the illustrative embodiment, the first lens member 110 may be formed from glass, polymer or any other suitable material for transmitting and focusing the visible wavelength band. Glass has the properties of high transmission for the visible band while blocking some other bands of the electromagnetic spectrum from passing through. Glass has a lower index of refraction than germanium and is around 1.5, depending on the wavelength. The focal length of the first lens member 110 may be substantially similar to that of the second lens member 120, for their respectively wavelengths, to help the lens system 100 focus the first wavelength and the second wavelength onto a common focal plane 150.

In some illustrative embodiments, and as shown in FIG. 1, the lens system 100 may have a convex incoming light surface and a concave outgoing light surface, sometimes called a meniscus shape. In other cases, the lens system 100 may be concave-convex, concave-concave, convex-convex or any other shape, depending on the application. In some cases, the lens system 100 may be a hybrid lens, such as a Fresnel lens, or any other type of lens as desired. In the illustrative embodiment, the lens system 100 may have a greater thickness in the middle than at the edges. However, it is contemplated that the lens system 100 may have a uniform thickness, a greater thickness at the edges than in the middle, or any other thickness profile as desired. Additionally, the illustrative lens system 100 may have any diameter, as desired.

In the illustrative embodiment, the infrared band may be selected for the second lens member 120 because the second lens member 120, being larger in surface area than the first lens member 110, may collect and transmit more radiation than the first lens member 110. Since, for some applications, the quantity of infrared light and the efficiency of the infrared detectors may be less than that in the visible band, it may be desirable to collect and focus more radiation from the infrared band. More generally, however, it is contemplated that the relative dimensions of the first lens member 110 and the second lens member 120 may be selected based on, for example, the relative desired intensities of the first band of wavelengths and the second band of wavelengths at the common focal plane 150.

Figure 2:
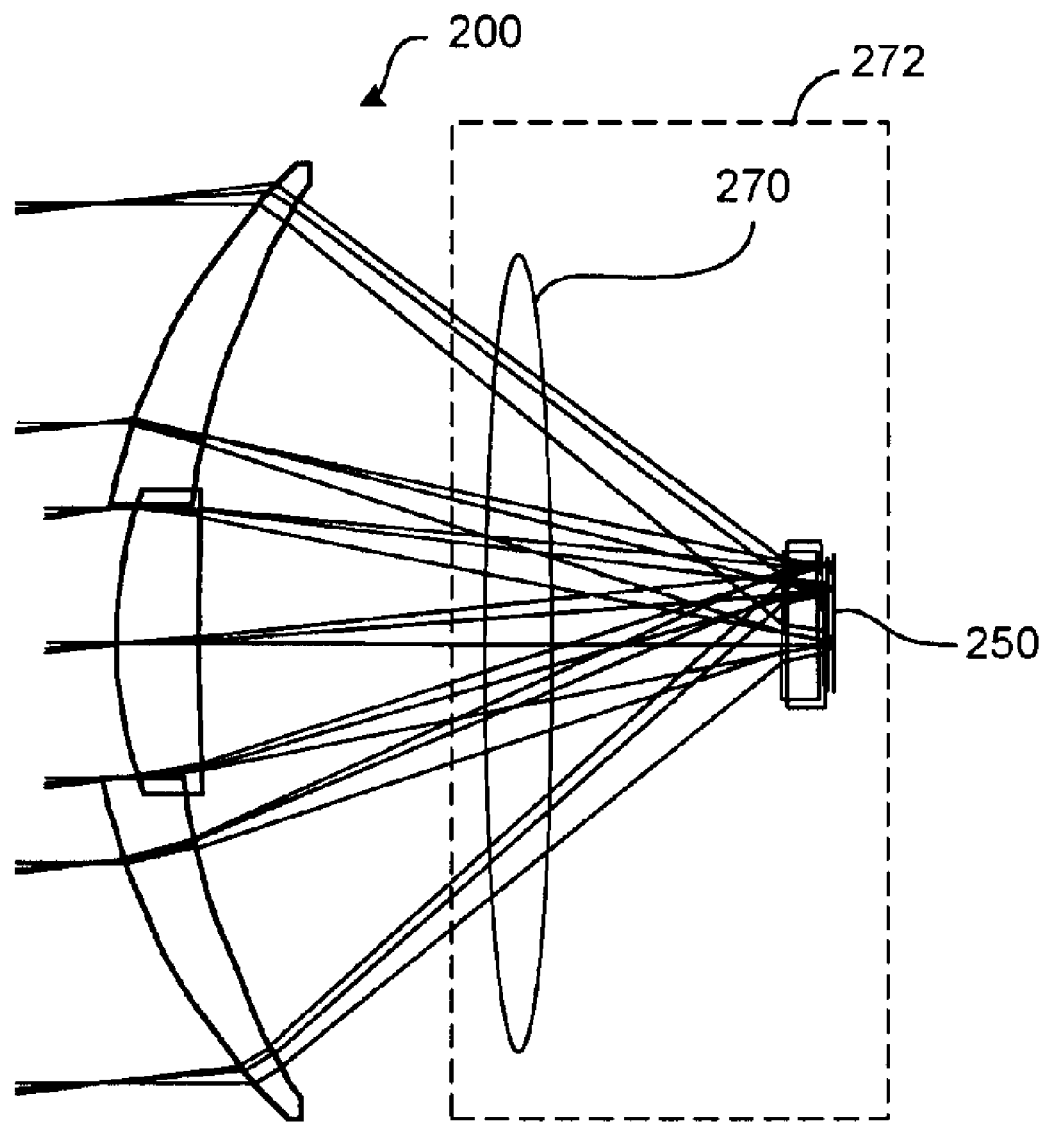
FIG. 2 is a schematic diagram of an illustrative lens system with an additional lens situated between the lens system and a common focal plane.

FIG. 2 is a schematic diagram of an illustrative lens system 200 with an additional lens situated between the lens system 200 and a common focal plane 150. As can be seen in FIG. 2, and in some embodiments, it may be desirable to provide a second lens 270 between a first lens system 200 and the focal plane 250 to help improve the imaging of the first lens system 200. In the illustrative embodiment, the second lens 270 may be adapted to transmit and further focus the wavelength bands that are transmitted and at least partially focused by the first lens system 200. For the visible and infrared bands, the second lens 270 may be made from, for example, sodium chloride or any other suitable material or material system. The second lens 270 may be enclosed in a protected environment 272 as shown in dashed lines, if desired.

Figure 3:
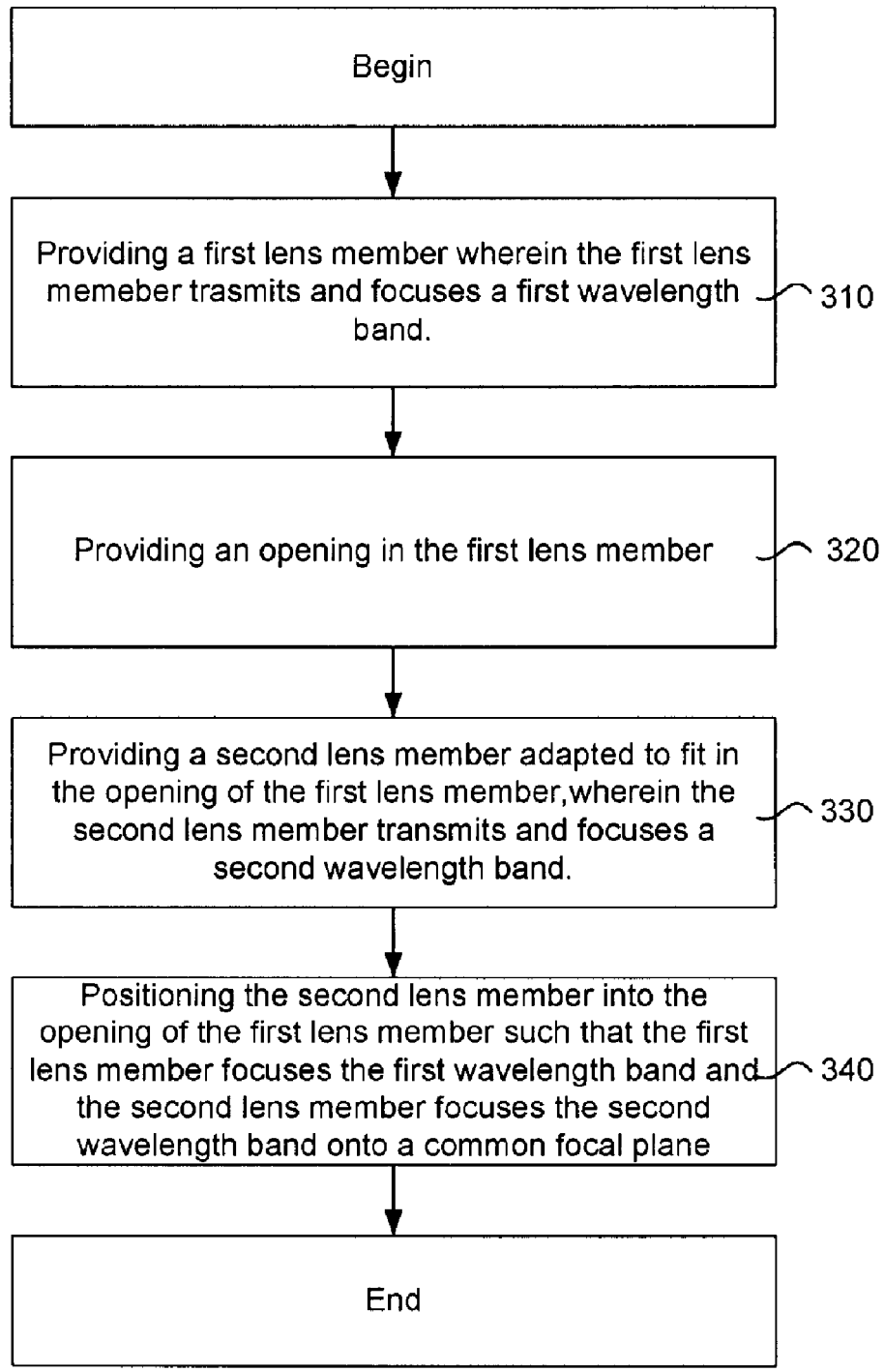
FIG. 3 is a schematic flow chart of an illustrative method of making a dual-band lens.

FIG. 3 is a schematic flow chart of an illustrative method of making an illustrative dual-band lens. First, a first lens member that transmits and focuses a first wavelength band may be provided as shown at 310. The material used for the first lens member may be selected based on the desired wavelength band. For example, if the desired wavelength band is the infrared band, germanium may be selected as the material of choice. However, it is contemplated that the first lens member may be adapted to focus and transmit any wavelength band, as desired. The first lens member may have a desired focal length.

Next, one or more opens may be formed in the first lens member, as shown at 320. The one or more openings may be formed by drilling, laser ablation, etching, or any other suitable technique, as desired. Alternatively, the first lens member may be molded to include one or more openings. The location and size of the openings may depend on the application. In some cases, one opening may be positioned at the center of the first lens member, as best shown in FIG. 1.

Next, a second lens member may be provided, as shown at 330. The second lens member may transmit and focus a second wavelength band. The material used for the second lens member may be selected based on the desired wavelength band. For example, if the desired wavelength band is the visible band, glass, polymer or other suitable material may be selected as the material of choice. However, it is contemplated that the second lens member may be adapted to focus and transmit any wavelength band, as desired. The second lens member may have a desired focal length.

Next, the second lens member may be positioned in the opening of the first lens member, as shown at 340. The second lens member may be positioned in the opening of the first lens member such that the first lens member and the second lens member focus the first wavelength band and the second wavelength band, respectively, onto a common focal plane. The second lens member may be secured to the first lens member in any desirable fashion, such as via an adhesive or the like.

Figure 4:
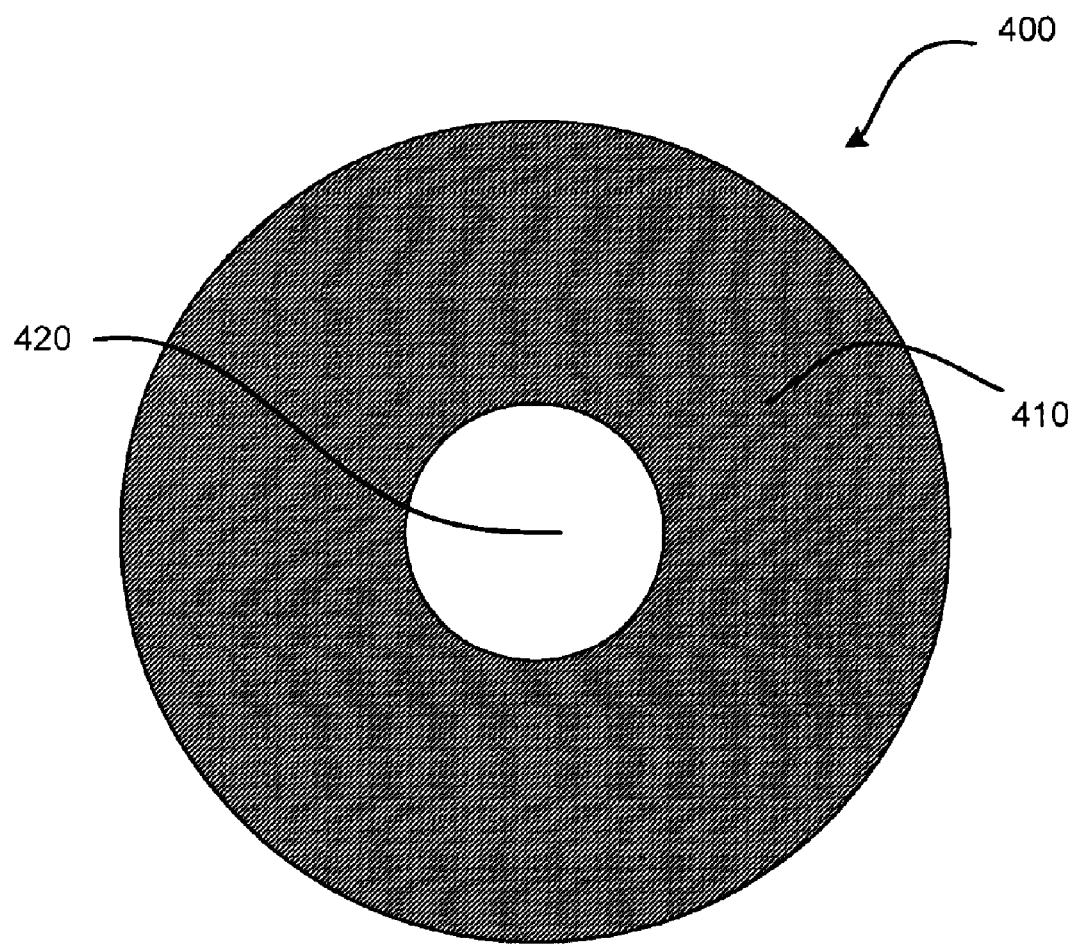
FIG. 4 is a schematic diagram of a front view of an illustrative dual-band lens.

FIG. 4 is a schematic diagram of a front view of an illustrative dual-band lens 400. In this illustrative embodiment, the first lens member 410 assumes an annular shape, with an opening in the middle. The second lens member 420 is then situated in the opening of the first lens member 410. In the illustrative embodiment, the opening is located at the center of the first lens member. However, it is contemplated that the opening may be offset to one side of the first lens member 410, and/or multiple holes may be provided, if desired. The ratio of the size of the second lens member 420 to the size of the first lens member 410 may be selected based on, for example, the relative desired intensities of the first band of wavelengths and the second band of wavelengths at the common focal plane.

Figure 5:
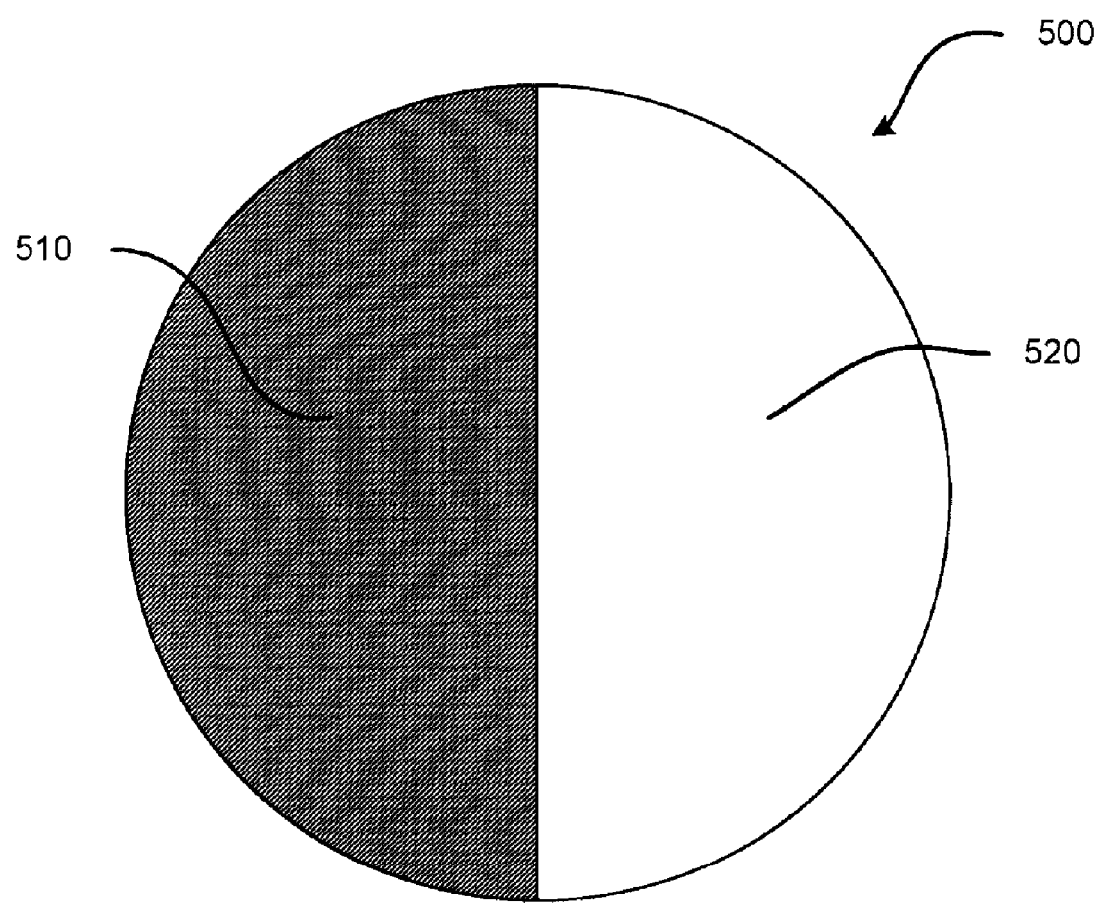
FIG. 5 is a schematic diagram of a front view of another illustrative dual-band lens.

FIG. 5 is a schematic diagram of a front view of another illustrative dual-band lens 500. In this illustrative embodiment, the first lens member 510 may form one side of the lens 500, and the second lens member 520 may form the other side of the lens 500. In the illustrative embodiment, the first lens member 510 and the second lens member 520 form substantially the same percentage of the aperture surface of the lens 500. However, this is not required, and it is contemplated that the ratio of the size of the second lens member 520 to the size of the first lens member 510 may be selected based on, for example, the relative desired intensities of the first band of wavelengths and the second band of wavelengths at the common focal plane. Also, the transition line between the first lens member 510 and second lens member 520 is shown relatively straight in FIG. 5, it is contemplated that the transition line may be curved or form any other shape, as desired.

Figure 6:
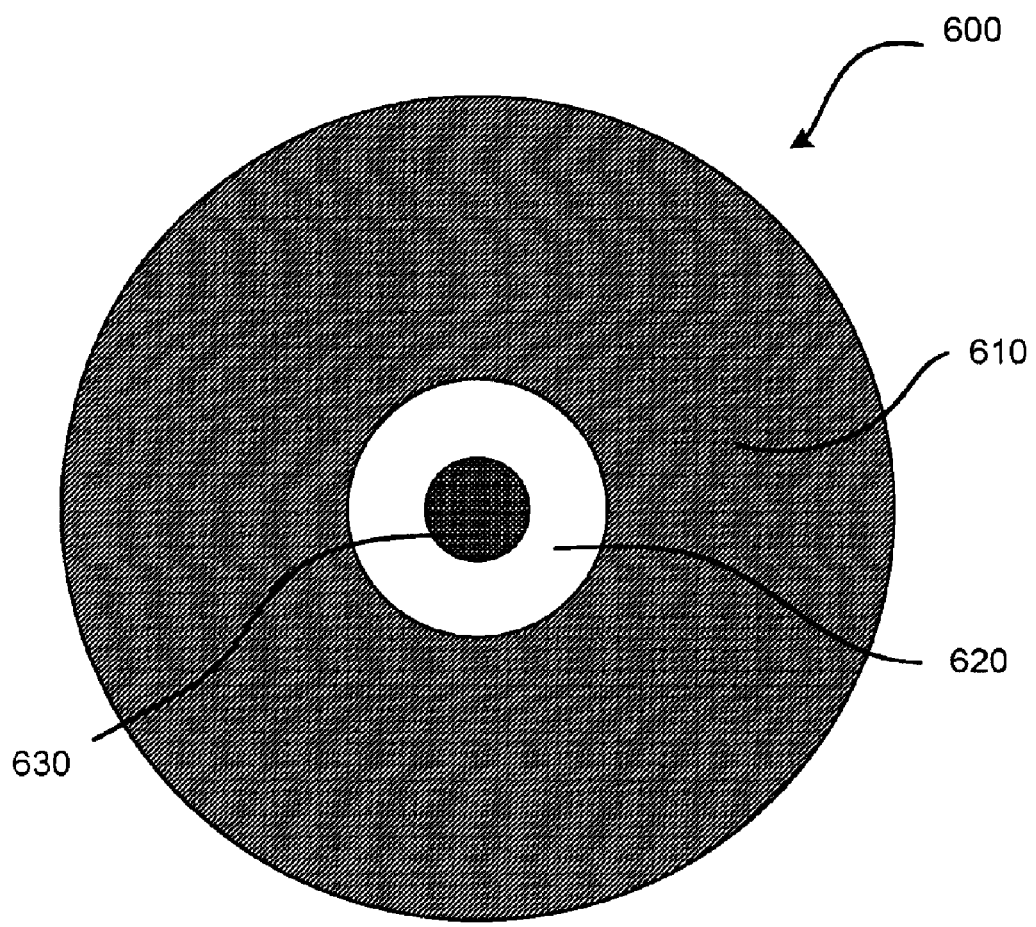
FIG. 6 is a schematic diagram of a front view of an illustrative triple-band lens.

FIG. 6 is a schematic diagram of a front view of an illustrative triple-band lens 600. The illustrative embodiment of FIG. 6 is similar to that of FIG. 4 except that FIG. 6 contains a third lens member 630, wherein the third lens member 630 may be adapted to transmit and focus a third wavelength band of the electromagnetic spectrum onto the same focal plane as the first and second lens members 610 and 620. In one example, the third lens member 630 may be adapted to transmit and focus the visible band, while the second lens member 620 may be adapted to focus and transmit the mid-infrared band, and the first lens member 610 may be adapted to transmit the high infrared band, all onto a common focal plane. These are, however, only examples, and it is contemplated that any desired wavelength bands may be selected for each of the first, second and third lens members, as desired. In the illustrative embodiment of FIG. 6, the third lens member 630 may be situated inside an opening in the second lens member 620.

Figure 7:
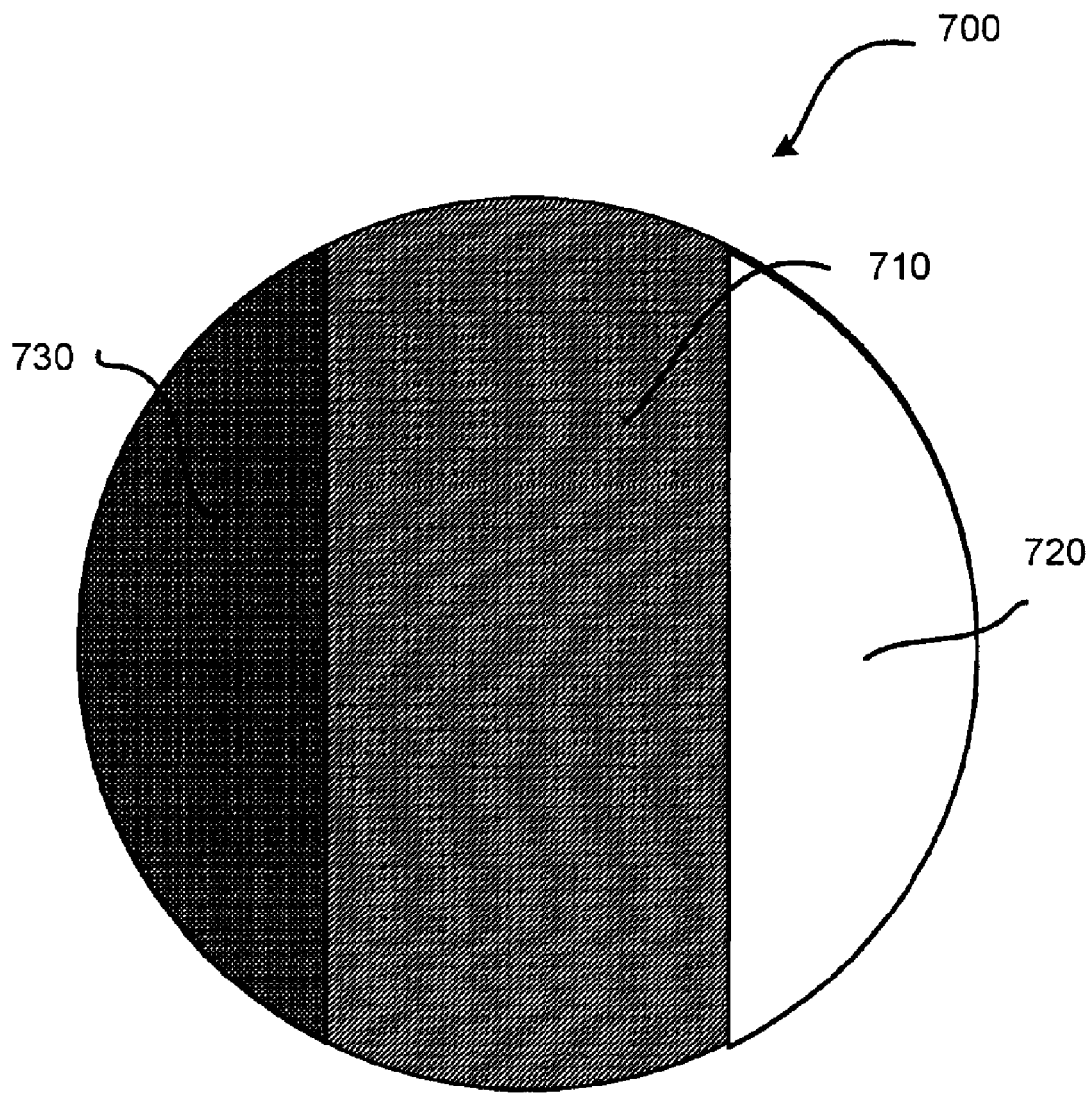
FIG. 7 is a schematic diagram of a front view of another illustrative triple-band lens.

FIG. 7 is a schematic diagram of a front view of another illustrative triple-band lens 700. FIG. 7 is similar to the illustrative lens system of FIG. 5, with the addition of a third lens member 730. In one case, as illustrated, the first member 710 may form a middle column of the lens system 700, the second member 720 may be located on one side of the first member 710, and the third member 730 may be located opposite the second member 720. However, this is not required. Also, in the illustrative embodiment, the transition line between the first member 710 and second member 720 and the first member 710 and third member 730 are shown relatively straight. However, the boundary lines may be curved or assume any other configuration as desired.

Figure 8:
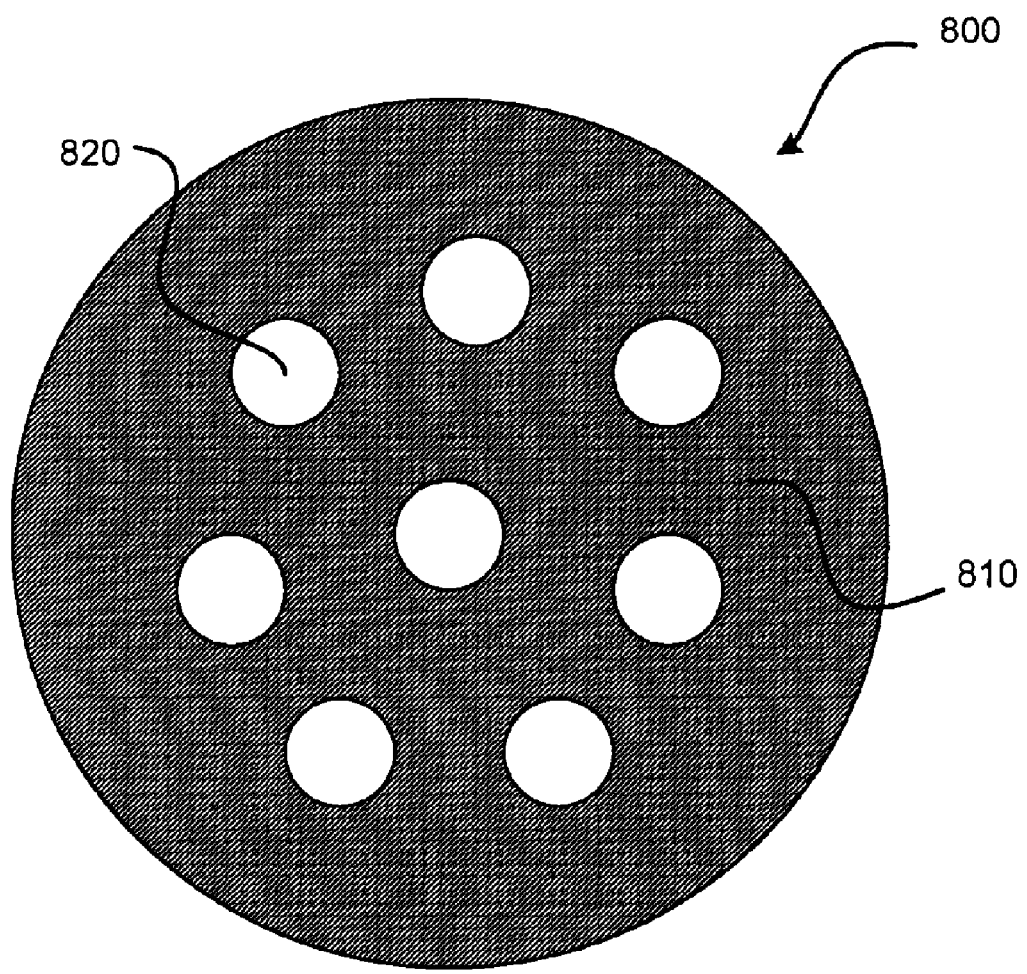
FIG. 8 is a schematic diagram of a front view of yet another dual-band lens.

FIG. 8 is a schematic diagram of a front view of yet another dual-band lens 800. The illustrative lens 800 includes a first lens member 810 that is adapted to transmit and focus a first wavelength band. The first lens member 810 includes a number of openings or holes. The number of openings or holes may be positioned in a pattern, positioned randomly, or at any other desired position. A number of second lens members 820 that are adapted to transmit and focus a second wavelength band are positioned in the number of openings or holes in the first lens member 810.

The size of the openings as depicted in FIG. 8 is only illustrative, and it is contemplate that the number of openings may be any size and/or shape, and form any desired ratio of the surface area of the lens aperture as desired. The illustrative embodiment shows eight openings in the first member 810. However, any number of openings in the first member 810 may be provided as desired. Additionally, in some cases, the number of openings may be substantially the same size. Yet in other cases, the openings may vary in size, as desired.

Figure 9:
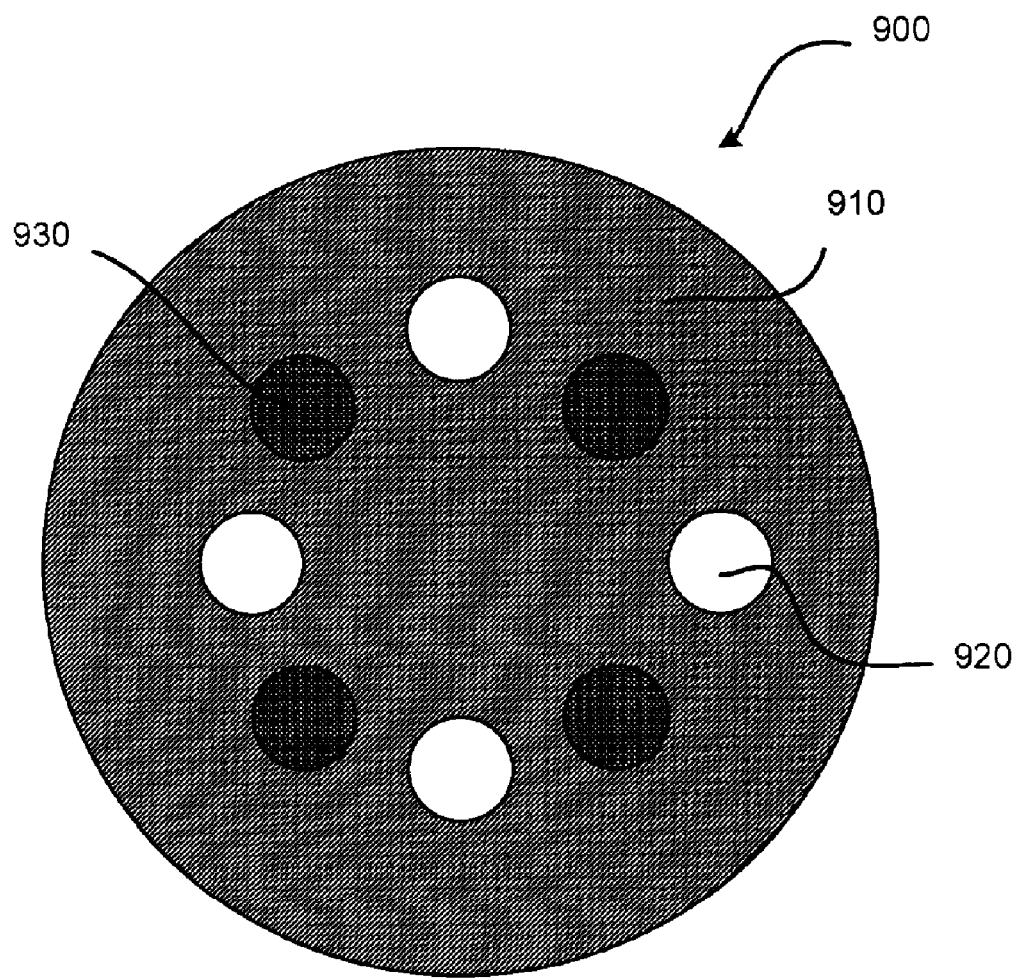
FIG. 9 is a schematic diagram of a front view of yet another triple-band lens.

FIG. 9 is a schematic diagram of a front view of another triple-band lens 900. This illustrative embodiment is similar to that shown in FIG. 8, except that selected holes in the first lens member 910 include second lens members 920 and selected holes include third lens members 930. The first lens member 910 may be adapted to transmit and focus a first wavelength band, the second lens members 920 may be adapted to transmit and focus a second wavelength band, and the third lens members 930 may be adapted to transmit and focus a third wavelength band. The pattern of the openings in the first lens member 910 is only illustrative, and it is contemplated that any pattern of the one or more openings in the first lens member 910 may by used, as desired.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

What is claimed is:

1. A lens system, comprising:
a first lens including a first region and a second region;
the first region made of a first material, and is shaped to partially focus a first band of wavelengths onto a focal plane;
the second region made of a second material that is different from the first material, and is shaped to partially focus a second band of wavelengths onto the focal plane;
a second lens including a third material that is different from the first material and the second material, the third material transmits both the first band of wavelengths and the second band of wavelengths, the second lens is situated between the first lens and the focal plane;
wherein the second lens, in conjunction with the first region of the first lens, focuses the first band of wavelengths onto the focal plane;
the second lens, in conjunction with the second region of the first lens, focuses the second band of wavelengths onto the focal plane;
the second lens, in conjunction with the first region of the first lens, does not focus the second band of wavelengths onto the focal plane; and
the second lens, in conjunction with the second region of the first lens, does not focus the first band of wavelengths onto the focal plane.

2. The lens system of claim 1 wherein the first region of the first lens has an annular shape defining a hole in the middle, and the second region is situated in the hole of the first region.

3. The lens system of claim 1 wherein the first band of wavelengths is in the infrared band.

4. The lens system of claim 1 wherein the first band of wavelengths is in the mid infrared band.

5. The lens system of claim 1 wherein the first band of wavelengths is in the visible band.

6. The lens system of claim 5 wherein the second band of wavelengths is in the infrared band.

7. The lens system of claim 5 wherein the second band of wavelengths is in the mid infrared band.

8. The lens system of claim 1 wherein the first material is glass.

9. The lens system of claim 1 wherein the first material is a polymer.

10. The lens system of claim 1 wherein the second material is germanium.

11. The lens system of claim 1, wherein the third material is sodium chloride.

12. The lens system of claim 1, wherein the first material is glass, the second material is germanium, and the third material is sodium chloride.

13. The lens system of claim 1, wherein the first material is a polymer, the second material is germanium, and the third material is sodium chloride.

* * * * *